United States Patent [19]
Yamagishi et al.

[11] Patent Number: 6,141,491
[45] Date of Patent: *Oct. 31, 2000

[54] METHOD FOR JUMP-REPRODUCING VIDEO DATA OF MOVING PICTURE CODED WITH HIGH EFFICIENCY

[75] Inventors: Toru Yamagishi; Ken Miyazaki; Kentaro Yokouchi, all of Yokohama, Japan

[73] Assignee: Victor Company of Japan, Ltd., Yokohama, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/662,911

[22] Filed: Jun. 13, 1996

Related U.S. Application Data

[62] Division of application No. 08/213,805, Mar. 16, 1994, Pat. No. 5,535,008.

[30] Foreign Application Priority Data

| Mar. 16, 1993 | [JP] | Japan | 5-81327 |
| Mar. 17, 1993 | [JP] | Japan | 5-82782 |
| Jan. 14, 1994 | [JP] | Japan | 6-16008 |

[51] Int. Cl.[7] .................................................. H04N 5/917
[52] U.S. Cl. .................................... 386/109; 386/112
[58] Field of Search ............................ 358/335, 310, 358/312; 348/423; 369/60; 360/10.1, 10.3, 72.1, 72.2; 386/29, 33, 95, 109, 111, 112, 68, 81, 82

[56] References Cited

U.S. PATENT DOCUMENTS

| 4,931,879 | 6/1990 | Koga et al. | 386/111 |
| 4,985,784 | 1/1991 | Tsuboi et al. | 386/109 |
| 5,040,061 | 8/1991 | Yonemitsu | 348/401 |
| 5,084,852 | 1/1992 | Bailey | 360/39 |
| 5,282,049 | 1/1994 | Hatakenaka | 358/335 |

(List continued on next page.)

FOREIGN PATENT DOCUMENTS 2-72780  3/1990  Japan .

OTHER PUBLICATIONS

Yashuhiro Yamada et al., "The Coding Technique Of Motion Pictures For Storage Media", Television Academic Journal, vol 45, No. 7, pp. 807–812, 1991.
Compact Disc Digital Audio, M. G. Carasso, et al., *Philips Technical Review*, vol. 40, 1982, No. 6, pp. 149–180, Published Sep. 10, 1982.
US CL450 User's Manual (C–Cube Microsystems, 1 page).
US MPEG Standard ISO CD 11172 (pp. 9, 10, D–56 and D–57).

*Primary Examiner*—Wendy Garber
*Assistant Examiner*—Aung S. Moe
*Attorney, Agent, or Firm*—Jacobson, Price, Holman & Stern, PLLC

[57] ABSTRACT

A disk stores data groups (GOP) of compressed picture data arranged over sectors. A 1st data indicative of a compression method and a 2nd data indicative of the presence of the GOP are contained in a leading sector. Data D (independent frame) is located at the head of the GOP. The 1st and 2nd data and GOP are aligned in order. The 1st data related to a 2nd GOP is detected after data D of the 1st GOP is reproduced to reproduce data D of the 2nd GOP. Data D arranged by an interval in the GOP are reproduced. In a quick traverse/reverse mode, a 2nd data D next to a 1st data D already reproduced is detected from a position of the GOP corresponding to a value obtained by subtracting/adding a fixed value from/to an integerfold of the interval to reproduce the 2nd data. Data D scattered over sectors of a disk are reproduced. Each sector has a 1st and a 2nd field. The 1st field stores signals not interleaved relative to signals of the 2nd field. A positional data of a leading sector is recorded in the 1st field. The leading sector is located in a 3rd field in which data D is recorded. The positional data is detected to reproduce the data D.

4 Claims, 7 Drawing Sheets

U.S. PATENT DOCUMENTS

| | | | |
|---|---|---|---|
| 5,289,276 | 2/1994 | Siracusa et al. | 348/467 |
| 5,371,602 | 12/1994 | Tsuboi et al. | 386/111 |
| 5,440,345 | 8/1995 | Shimoda | 348/411 |
| 5,471,450 | 11/1995 | Yonemitsu et al. | 369/60 |
| 5,504,585 | 4/1996 | Fujinami et al. | 360/10.1 |
| 5,537,409 | 7/1996 | Moriyama et al. | 348/423 |
| 5,552,896 | 9/1996 | Yoshida | 386/105 |
| 5,557,331 | 9/1996 | Honjo | 348/423 |
| 5,602,956 | 2/1997 | Suzuki et al. | 396/111 |

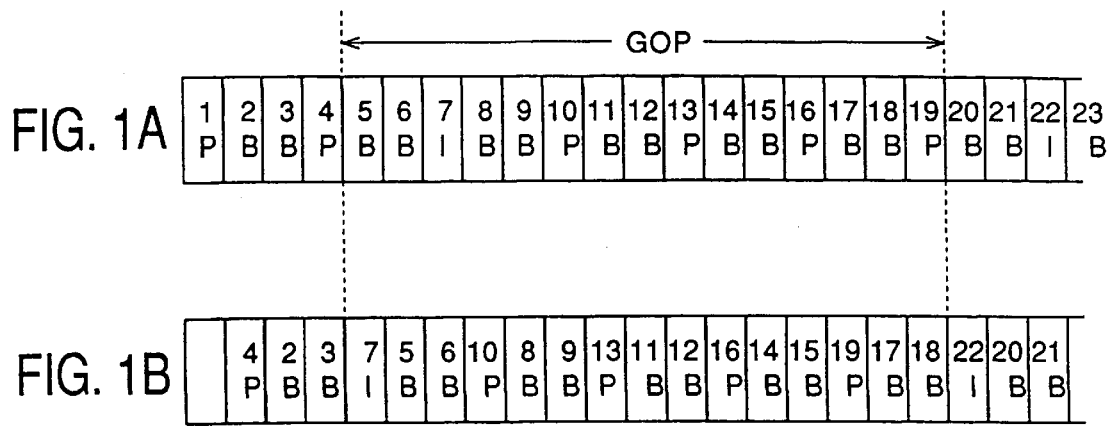
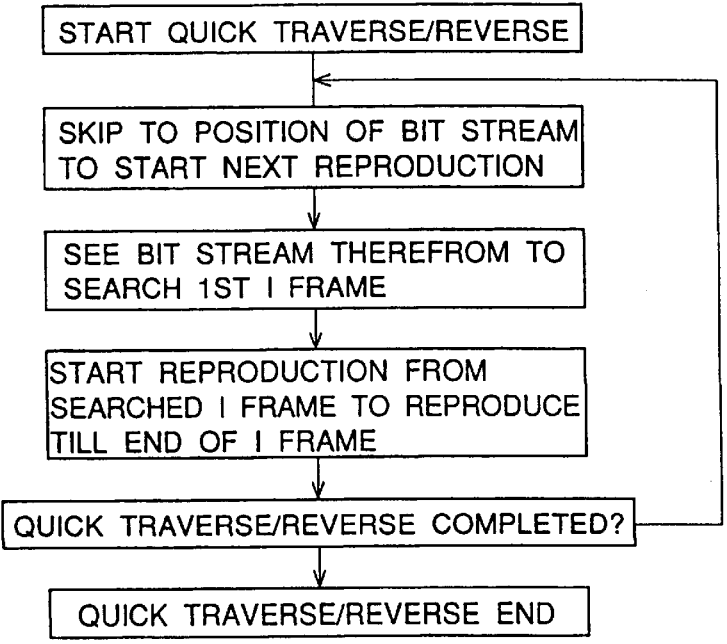
FIG. 2

| SPACING | 36 | 37 | 38 | 39 | 40 | 41 | 42 | 43 |
|---|---|---|---|---|---|---|---|---|
| TIMES OF APPEARANCE | 2 | 3 | 20 | 100 | 372 | 59 | 6 | 2 |

METHOD FOR JUMP-REPRODUCING VIDEO DATA OF MOVING PICTURE CODED WITH HIGH EFFICIENCY

This is a Divisional of application Ser. No. 08/213,805 filed Mar. 16, 1994 now U.S. Pat. No. 5,535,008.

BACKGROUND OF THE INVENTION

The present invention relates to a method for reproducing pictures which reproduces video data of a moving picture coded with high efficiency by a MPEG (Moving Pictures Expert Group) method or the like in a jump reproducing mode.

The study for compressing a video signal of a moving picture with high efficiency to transmit, record and reproduce it has been actively carried out. For example, an attempt has been made to record, into a small disk, video data of a moving picture compressed with high efficiency. For the purpose of preparing an International Standard used in coding a video signal of a moving picture with high efficiency to compress video data, the MPEG successively proposes various kinds of data formats relating to video data compressed with high efficiency. The study and development have been also carried out for a practical system for transmitting, recording and reproducing video data compressed with high efficiency in accordance with the data formats proposed by the MPEG (a compressed video signal compressed with high efficiency by the MPEG method).

In a coding system (MPEG system) for video data of a moving picture using a recording medium for recording digital data such as CD-ROM, a predictive coding procedure is employed. There are three predictive methods, i.e., an intraframe predictive method which is applied to compress picture data to obtain a picture {I picture (Intra Pictures)} frame (hereinafter referred to I frame), an interframe predictive method for effecting an interframe prediction on the basis of picture data of a past frame which is applied to compress picture data to obtain a picture {P picture (Predicted Pictures)} frame (hereinafter referred to as P frame), and an interframe predictive method for effecting an interframe prediction on the basis of both picture data of a past frame and picture data of a future frame which is applied to compress picture data to obtain a picture {B picture (Bi-directional Prediction Pictures)} frame (hereinafter referred to as B frame). A predetermined header is added, to obtain picture coding data, to digital data in the state where the frames according to the aforementioned three picture modes are disposed on the time base in a predetermined mode.

In the MPEG method, the relationship between the compression rate of the picture data in the I frame, the compression rate of the picture data in the P frame and the compression rate of the picture data in the B frame is expressed as (the compression rate of the picture data in the I frame)<(the compression rate of the picture data in the P frame)<(the compression rate of the picture data in the B frame). It is necessary that in reproduction, the reproduction is carried out from a sequence header of an entry point, and that in reproduction of picture data of the B frame in which the prediction is carried out using the picture data of the past frame and the picture data of the future frame, the picture data of the future P frame which was used for the prediction of the picture data of the B frame is recorded before the B frame.

The coding according to the MPEG system as described above will now be described with reference to FIGS. 1A and 1B.

FIGS. 1A and 1B each show an example of arrangement of various frames in the MPEG method.

FIG. 1A shows the order of frames of picture before being coded, and FIG. 1B shows the order of frames of pictures after being coded.

A group of pictures (hereinafter referred to as GOP) indicates that a plurality of frames are arranged in a single form in order to facilitate the signal processing of picture data. In the FIG. 1 example, one GOP is composed of 15 frames, and at least one I frame is set every GOP.

In FIG. 1, I in frame Nos. 7 and 22 indicates I frame.

And P in frame Nos. 1 and 4 indicates P frame.

Further, in FIG. 1, B in frame Nos. 5 and 6indicates B frame.

In the coded case, a quantity of codes of the P frame and the B frame in which only a difference of the signal is coded is considerably small as compared with a quantity of codes of the I frame.

FIG. 1A shows the order of frames before being coded. In the coding, one GOP is composed, for example, of frames from frame Nos. 5 to 19.

FIG. 1B shows the order in which coded data are recorded in a recording medium. One GOP is composed of frames from frame Nos. 7 to 18, and the first frame constitutes I frame. The order recorded in the recording medium is the same as the order of frames displayed on a display unit after decoding but is slightly different from the order of a coding. Since decoding of the B frame requires data of the I frame and P frame, the P frame behind the B frame is recorded prior to the B frame at the time of coding, and is first read at the time of reproduction.

The reproduction of video from the video data of a moving picture coded with high efficiency by the MPEG method is carried out by various reproduction modes such as a slow reproduction mode, a static picture reproduction mode, a frame feed reproduction mode, a jump reproduction mode (a scan reproduction mode) and the like in addition to a normal reproduction mode.

Incidentally, in the case where the video data of a moving picture coded with high efficiency by the MPEG method is reproduced in the jump reproduction mode to obtain a reproduced video in a successively thinned-out state from the video data of a moving picture coded with high efficiency by the MPEG method, only the I frame having a sequence header and a GOP header disposed immediately therebefore is successively reproduced.

Conventionally, in the case where a reproduced video in a successively thinned-out state is obtained from video data of a moving picture coded with high efficiency by the MPEG method, the following operation is repeated so as to decode successive I frames. Such an operation comprises (1) a bit stream is continuously supplied to an MPEG video decoder; (2) in the MPEG video decoder, a sequence header is detected out of the bit stream supplied as described above, and video data of the subsequent I frame is decoded; (3) when the MPEG video decoder completes the decoding operation for the video data of one I frame, a central arithmetic processing unit receives a notice of the above completion; and whereby the central arithmetic processing unit searches a location where a next sequence header or a sequence header distant therefrom by a predetermined distance seems to be present to begin taking the bit stream therefrom, and the step returns to the above (1).

Incidentally, in order that a video reproduction system reproduces video data of a moving picture in a jump reproduction mode, when an operator gives an operating section a command so that the video reproduction system performs the operation in a jump reproduction mode, a disk drive device provided with an optical head causes the optical head to effect the seek operation in accordance with the command from the central arithmetic processing unit, data read by the optical head is once stored into a buffer memory, and the stored data is read from the buffer memory to continuously supply the bit stream to the MPEG video decoder. The MPEG video decoder sees the whole bit stream supplied thereto to detect the I frame therefrom and decode the video data. When the MPEG video decoder completes the decoding operation for the video data of one I frame, the central arithmetic processing unit receives a notice of such completion. The central arithmetic processing unit in turn issues a command to the disk drive device so as to cause the optical head to seek a location where an I frame which is next to the I frame already decoded or distant therefrom by a predetermined number of frames, seems to be present. However, in the case where the reproducing operation as previously mentioned is carried out to carry out the jump reproduction, since the I frame is detected by the MPEG video decoder, the video data of the I frame is decoded and after the completion of the decoding operation, a next seek operation is carried out, much time is taken other than the time such as time required for the seek operation of the optical head and time required till a servo operation enters a normal operation.

When video data of a moving picture coded with high efficiency by the MPEG method is reproduced in a jump reproduction mode, only the I frames with the video data compressed by applying the intraframe predictive method are successively reproduced from the video data of a moving picture coded with high efficiency by the MPEG method. Therefore, for example, if the central arithmetic processing unit sees all the bit streams so as to effect the detection operation of the sequence header, the detection of the sequence header can be possibly made in a short period of time. However, since the central arithmetic processing unit operates for processing many kinds of signals, enormous much time is taken in the case where the central arithmetic processing unit sees all the bit streams to effect the detection operation of the sequence header. For this reason, the detection operation of the sequence header has been heretofore carried out by the MPEG video decoder.

As described above, much waste time is required for the above-described detection operation of the sequence header, and as a result, much time is taken till the pictures of successive I frames are obtained. Thereby the number of pictures per unit time at the time of the jump reproduction decreases, resulting in an insufficient smoothness of the movement of a reproduced video. Measures for an improvement therefor has been demanded.

Further, in the case where a video reproduction system reproduces a picture by quick traverse/reverse from video data of a moving picture coded with high efficiency by an MPEG system, when an operator issues a command to an operating section so as to cause the video reproduction system to be operated in a reproduction mode of quick traverse/reverse, a central arithmetic processing unit in the video reproduction system sequentially controls the operation of various constituent portions of the video reproduction system in accordance with the steps shown in FIG. 2 illustrating the procedure for reproducing a picture by quick traverse/reverse from the video data of a moving picture coded with high efficiency by the MPEG method, thereby selecting I frame with a sequence header and a GOP header positioned immediately therebefore so as to obtain a quick traverse/reverse video.

More specifically, in the case where the reproducing operation of a picture by quick traverse/reverse video is carried out from video data of a moving picture coded with high efficiency by the MPEG method by the operation of constituent portions in the video reproduction system in accordance with the procedure as shown in FIG. 2, the following operation is carried out. A disk drive device provided with an optical head causes the optical head to effect the seek operation in accordance with a command of the central arithmetic processing unit, the data read by the optical head is once stored into a buffer memory, and the thus stored data is read from the buffer memory to continuously supply bit streams to an MPEG video decoder. The MPEG video decoder sees the whole bit stream supplied thereto to detect I frame therefrom and decode the video data of the I frame. When the MPEG video decoder completes the decoding operation in connection with the video data of one I frame, the central arithmetic processing unit receives a notice of such completion. The central arithmetic processing unit issues a command to the disk drive device so as to cause the optical head to seek a location where a next I frame seems to be present.

In the case where a picture is reproduced by quick traverse/reverse from the video data of a moving picture coded with high efficiency by the MPEG method as described above, the total time of (1) time required to skip to position of bit stream to start next reproduction, (2) time required to detect I frame after the start of reproduction of bit stream from the skipped position, and (3) time required to reproduce the entirety of the detected I frame is required every reproduction of the video data of successive I frames. However, as previously mentioned, the spacing between the successive I frames in the bit stream where I frame, P frame and B frame comprising the video data of a moving picture coded with high efficiency by the MPEG method are present in a mixed form is not constant but irregular. Therefore, the position at which skipping is effected as a position of bit stream to start next reproduction is, even at a fixed transfer rate, that skipping is made at a preceding position having enough room with respect to a position where I frame seems to be present so as to detect the I frame after the start of the reproduction of the bit stream from the skipped position. For this reason, the time required to detect the I frame as described above becomes extended, and as a result, the number of reproduced pictures per unit time decreases, resulting in an insufficient smoothness of the movement of the reproduced pictures. Measures for an improvement capable of making the aforesaid time as short as possible has been demanded.

Normally, in the case where video data is reproduced, by the reproduction system, from a recording medium having I, P and B frames recorded therein, the P and B frames cannot be decoded independently. For example, a picture of 30 frame/sec is decoded in unit of approximately 0.5 sec corresponding to 1 GOP, which is a minimum unit at which a complete picture can be restored.

In the case where the video data of a moving picture compressed as described above is reproduced, special reproductions such as a high speed reproduction for effecting reproduction at 2-fold speed, 3-fold speed, etc., and a reverse high speed reproduction for effecting high speed reproduction in a reverse direction in time are carried out. In this case, only the aforesaid independent frame (I frame) in which a reproduced picture is obtained only from codes within the frame is displayed on a display unit, and P frame and B frame are neither decoded nor displayed even if they are read.

In the conventional recording medium and the reproduction method therefor, the special reproduction is effected as follows. In case of a fixed transfer rate at which a quantity of codes delivered per unit time in the coding is substantially constant, a quantity of data corresponding to a length of 1 GOP capable of being independently reproduced or the number of sectors are calculated. A target point is accessed at an approximate skip distance, the whole data of the GOP is restored and only the I frame is displayed on the display unit.

Actually, however, since even the fixed transfer rate, the momentary data quantity is varied, it is necessary to start a reading considerably before the field to be accessed so as not to pass data which should be naturally accessed. Much time was taken for the access.

This poses problems that the complicated special reproduction cannot be accomplished, the special reproduction is limited to a random access, a search and the like, and the high speed reproduction such as the foldspeed reproduction cannot be accomplished.

Further, in case of a variable transfer rate coding in which a quantity of codes delivered per unit time in the coding is varied (for details, see Japanese Patent Application No. 339720/1992 filed by the present applicant, for example), the quantity of data per unit time considerably varies, and the aforementioned problems become further significant. In the conventional method for predicting a next access point from the quantity of data, the special reproduction was impossible.

As a method for solving the aforementioned problems, it is conceived that a Table is prepared which shows independent (I) frame access data indicative of an address of the first sector within a recording field in which independent frames are recorded with respect to all the independent frames, the data are recorded in a predetermined field of the recording medium, the data of the Table is first stored into a semiconductor memory such as a read S-RAM, etc. at the time of reproduction, and the special reproduction is carried out on the basis of the data of the Table. However, this poses a problem that a microcomputer in a reproduction system has to carry a huge burden of signal processing.

Generally, each sector of the recording medium is composed of subcode data in which control data such as a synchronous signal and an address, and a data field in which video data and the like are recorded.

As a further method for solving the aforementioned problems, there is conceived a method for recording the independent frame access data into a subcode field of a sector of a recording medium similarly to a music compact disk. In this case, address data recorded in one sector is not address data for all the independent frames but address data for several independent frames in the vicinity of the present frame is recorded.

However, in the above method, an interleave is applied for lowering the error rate between data of the subcode field and data of the data field. Therefore, the data of the subcode field is obtained only after the data of the data field is read, resulting in an increase in access time. This method is not suitable for the special reproduction.

For example, in CD-I (FMV) to which a musical compact disk is applied, not only compressed video and audio data but also various data are alternately recorded in unit of sector. It is impossible to obtain the access data for accessing pictures or sounds to be restored from only a specific sector. Reproduction order data is added every compressed data in predetermined unit to continuously restore the data.

As described above, the sector to be accessed next is indicated, and the special reproduction to some extent can be made. However, the data for access is recorded in the data field which requires complicate processing such as correction of error, deinterleave, etc. for the read data and so reading involves a variety of restrictions. The special reproduction is thus limited to the random access, search and the like, and the foldspeed reproduction or the like was actually impossible.

SUMMARY OF THE INVENTION

An object of the present invention is to provide a recording medium, a reproduction method and a reproduction system, which are suitable for jump reproducing video data coded with high efficiency by an MPEG method or the like.

The recording medium according to the present invention has a plurality of data groups recorded therein, the data group having a plurality of compressed data arranged over a plurality of sectors, a leading sector out of the plurality of sectors having a first data indicative of a compression method and a second data indicative of the presence of the data group, wherein data compressed in the least amount is situated at the head of the data group, and the first data, the second data and the data group are recorded in the order.

The reproduction method for reproducing data from a plurality of data groups according to the present invention comprises data groups having a plurality of compressed data arranged over a plurality of sectors, a leading sector out of the plurality of sectors including a first data indicative of compression method and a second data indicative of the presence of the data group, wherein data compressed in the least amount is situated at the head of the data group, and the first data, the second data and the data group are arranged in the order, the method including the steps of detecting the first data in connection with the second data group in response to the reproduction of data compressed in the least amount within the first data group, and reproducing the data compressed in the least amount within the second data group in response to the result of the detection.

The reproduction system according to the present invention comprises means for outputting a plurality of data groups having a plurality of compressed data arranged over a plurality of sectors, a leading sector out of the plurality sectors having a first data indicative of a compression method and a second data indicative of the presence of the data group, wherein data compressed in the least amount is situated at the head of the data group, wherein the output means outputs the first data, the second data and the data group in the order; means for reproducing the outputted data; and means for detecting the first data in connection with the second data group in response to the reproduction of data compressed in the least amount within the first data group, and supplying the data compressed in the least amount within the second data group from the output means to the reproduction means in response to the result of the detection.

Further, the reproduction method according to the present invention reproduces a plurality of data compressed in the least amount arranged at predetermined intervals in data groups having a plurality of compressed data arranged therein, the method comprising the steps of: in a quick traverse mode, detecting a second data compressed in the least amount to be reproduced next to a first data compressed in the least amount already reproduced from a position of the data group corresponding to a value obtained by subtracting a first fixed value from an integer fold of the predetermined intervals; in a quick reverse mode, detecting a third data compressed in the least amount to be reproduced next to the first data already reproduced from a position of the data group corresponding to a value obtained by adding a second fixed value to an integer fold of the predetermined intervals; and reproducing the second or the third data in response to the result of the detection.

Further, the reproduction system according to the present invention comprises means for outputting data groups having a plurality of compressed data arranged therein, the data group having a plurality of data compressed in the least amount arranged at predetermined intervals; means for reproducing the outputted data; and means, in a quick traverse mode, detecting the second data compressed in the least amount to be reproduced next to the first data compressed in the least amount already reproduced from a position of the data group corresponding to a value obtained by subtracting a first fixed value from an integer fold of the predetermined intervals; in a quick reverse mode, detecting the third data compressed in the least amount to be reproduced next to the first data already reproduced from a position of the data group corresponding to a value obtained by adding a second fixed value to an integer fold of the predetermined intervals, and supplying the second or the third data from the output means to the reproduction means in response to the result of the detection.

Furthermore, the recording medium according to the present invention has a plurality of data compressed in the least amount out of data arranged over a plurality of sectors recorded in a scattered fashion, each of the plurality of sectors having a first recording field and a second recording field, the first recording field having signals recorded therein, the signals not being interleaved relative to signals of the second recording field, wherein a first positional data indicative of a position of a leading sector of the plurality of sectors of a third recording field having a first data out of the plurality of data compressed in the least amount is recorded in the first recording field.

Still further, the reproduction method according to the present invention reproduces data compressed in the least amount, arranged in a scattered fashion and out of a data group having a plurality of data arranged over a plurality of sectors, each of the plurality of sectors having a first data field and a second data field, the first data field having signal data not interleaved relative to signal data in the second data field, wherein position data indicative of a position of a leading sector of the plurality of sectors in a third data field having the plurality of data compressed in the least amount is situated in the first data field, the method comprising the steps of reading the position data situated in the first data field having the signal data not interleaved relative to the signal data in the second data field, and reproducing the data compressed in the least amount in response to the read-out position data.

Still further, the reproduction method according to the present invention reproduces data compressed in the least amount, arranged in a scattered fashion and out of a data group having a plurality of data arranged over a plurality of sectors, each of the plurality of sectors having a first data field and a second data field, the first data field having signal data not interleaved relative to signal data in the second data field, wherein a first positional data indicative of a position of a leading sector of the plurality of sectors in a third data field having a first data out of the plurality of data compressed in the least amount and a plurality of second positional data each indicative of a position of a leading sector of a plurality of second data compressed in the least amount arranged at different positions away from and by the predetermined number of sectors from the first data compressed in the least amount are arranged in the first data field, the plurality of second positional data each being situated at a relative position from the first position data, the method comprising the steps of detecting the second positional data corresponding to the second data compressed in the least amount to be reproduced next from the first data field in response to the reproduction of the first data compressed in the least amount; obtaining an absolute leading-sector position of the second data to be reproduced from the second positional data indicative of the detected relative position; and reproducing the second data compressed in the least amount in response to the obtained absolute leading-sector position.

Further, the reproduction system according to the present invention comprises means for outputting a data group having a plurality of data compressed in the least amount, arranged in a scattered fashion and out of data arranged over a plurality of sectors, each of the plurality of sectors having a first data field and a second data field, the first data field having signal data not interleaved relative to signal data in the data field, wherein a first positional data indicative of a position of a leading sector of the plurality of sectors in a third data field having a first data out of the plurality of data compressed in the least amount and a second positional data indicative of a position of a leading sector of a second data compressed in the least amount arranged at a position away from and by the predetermined number of sectors from the first data compressed in the least amount are arranged in the first data field, the second position data being situated at a relative position from the leading sector position of the first data compressed in the least amount; means for detecting the second positional data indicative of the relative position from the first data field; means for obtaining an absolute leading-sector position of the second data compressed in the least amount from the detected second position; and means for reproducing the second data compressed in the least amount in response to the obtained absolute leading-sector position.

BRIEF DESCRIPTION OF THE DRAWINGS

In the accompanying drawings:

FIGS. 1A and 1B illustrate examples of arrangement of picture frames in the MPEG method;

FIG. 2 is a flow chart showing one example of a procedure for reproducing pictures by quick traverse/reverse from video data of a moving picture coded with high efficiency by the MPEG method;

DETAILED DESCRIPTION OF THE PREFERRED EMBODIMENTS

The method for jump reproducing video data of a moving picture coded with high efficiency by an MPEG method or the like according to the present invention will be described hereinafter with reference to the accompanying drawings.

Figure 3:
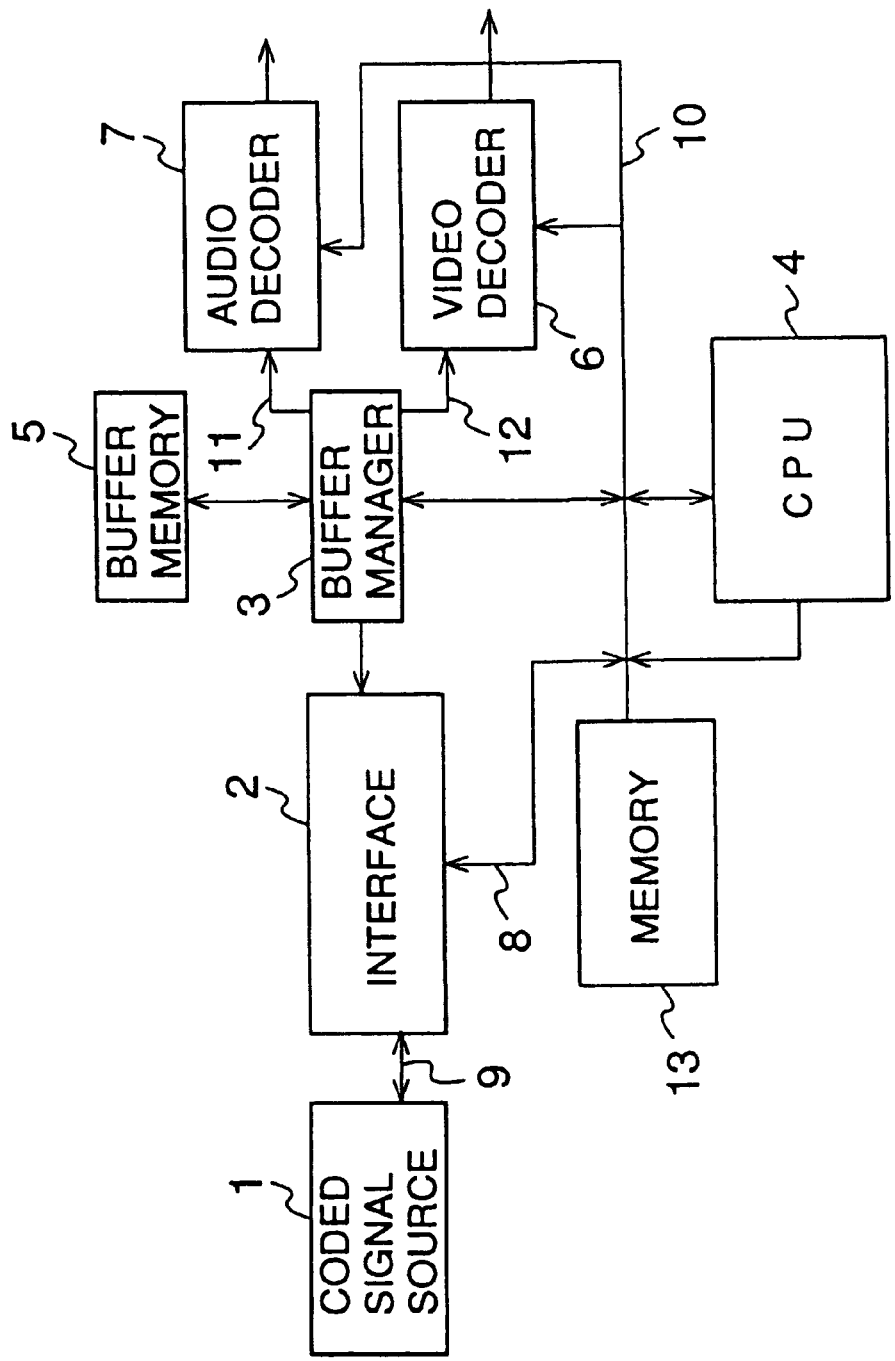
FIG. 3 is a block diagram showing a schematic configuration according to one embodiment of a reproduction system used in a method for jump reproducing video data of a moving picture coded with high efficiency according to the present invention.

The reproduction system shown in FIG. 3 is composed of a coded signal source 1, an interface 2, a buffer manager 3, a central arithmetic processing unit 4, a buffer memory 5, a video decoder 6, and an audio decoder 7 and a memory 13.

In the reproduction system shown in FIG. 3, the coded signal source 1 has a configuration capable of delivering a data column read from a data recording medium, for example, such as an optical disk, a photomagnetic disk and other recording media in which is recorded the data column to be reproduced in a state where a predetermined header composed to include at least data indicating that coded data are video data or audio data and time data (time stamp) per coded data is added to a time series data column (bit stream) including video data of a moving picture coded with high efficiency by the MPEG method or the like and audio data in which a picture frame (I frame) to which intraframe predictive method is applied to compress video data in the least amount and picture frames (P frame and B frame) to which an interframe prediction is applied to compress video data are at least present in a mixed form.

Alternatively, the coded signal source 1 can be of a configuration capable of delivering a compressed data column supplied through communication lines.

In the ensuing description, the aforesaid coded signal source 1 is constructed which can output data read from an optical disk in accordance with a CD (Compact Disk) Standard in which audio data compressed with high efficiency and video data of a moving picture compressed with high efficiency by the MPEG method are recorded.

In the data column to be reproduced in a state where a predetermined header (as will be described later) including at least data which indicates a sort of the compressed data and time data per compressed data is added to a time series bit stream including video data of a moving picture coded with high efficiency by the MPEG method or the like in which the I frame, P frame and B frame are present in a mixed form and audio data, the header portion includes data indicative of the sort of data such as audio data, video data and other data, time data per data, and various data such as sector No. The aforementioned audio data, video data and various data constitute a bit stream.

The coded signal source 1 delivers to a transmission line 9 a data column (a reproduction data column) to be reproduced in a state where a header including at least data which is of the sort of the various data and time data per data is added to a bit stream including a data column reproduced from an optical disk, for example, i.e. at least audio data and video data, under the control of a control signal supplied through a transmission line 8 and the interface 2 from the central arithmetic processing unit 4.

The reproduction data column delivered to the transmission line 9 as described above is stored into the buffer memory 5 through the interface 2 and the buffer manager 3. The buffer manager 3 has the function to perform the operation substantially at real time, which under the control of a control signal supplied through the bus 10 from the central arithmetic processing unit 4, sequentially writes the data transmitted through the transmission line 9 and the interface 2 from the coded signal source 1 into the buffer memory 5 or reads the audio data in the data column stored in the buffer memory 5 to supply it to the audio decoder 7 through the bus 11, and reads the video data in the data column stored in the buffer memory 5 to supply it to the video decoder 7 through the bus 12.

In the case where the reproduction system is operated in a normal reproduction mode, the central arithmetic processing unit 4 is operated in accordance with the program stored in the memory 13 to see data which indicates the sort of data and time data per data included in the header portion in the data column stored in the buffer memory 5 through the buffer manager 3, that is, to judge whether the data is the audio data or video data and to know a moment to reproduce the audio data and video data. Data according the sort of picture or sound in the data stored in the buffer memory 5 are transferred through the buffer manager 3 in response to the demand from each MPEG decoder 6 and 7.

The demand from each of decoders 6 and 7 is issued at timing such that the reproduction state is continuous, and the data is transferred accordingly whereby the continuity of the signal to be reproduced on the time base is assured. It is to be noted that at the start of reproduction, a discontinuous state with the reproduction from the unredroduction time assumes. Therefore, the decoders 6 and 7 are provided with the function capable of starting the reproduction at a predetermined time. The aforementioned function capable of starting the reproduction at a predetermined time is possible to give a command to the decoders 6 and 7 through the bus 10 from the central arithmetic processing unit 4, or to supply data containing the time stamp to the decoder 6 or 7 by the bus 11 or bus 12 so that the reproduction can be started at a predetermined time on the basis of the data containing the time stamp by the decoder 6 or 7.

As previously mentioned, when the audio data is transferred to the audio decoder 7 through the buffer manager 3 and the bus 11 from the buffer memory 5 under the control of the buffer manager 3, the audio decoder 7 outputs a reproduced audio signal obtained by expanding audio data which is obtained by compressing an audio signal supplied thereto. Also, when the video data is transferred to the video decoder 6 through the buffer manager 3 and the bus 12 from the buffer memory 5 under the control of the buffer manager 3, the video decoder 6 outputs a reproduced video signal obtained by decoding video data which is obtained by compressing a video signal supplied thereto. From the audio decoder 7, the reproduced audio signal is outputted in a state continuous on the time base, whereas from the video decoder 6, the video signal is outputted in a state continuous on the time base.

Next, when an operator gives a command to an operating section (not shown) to cause the reproduction system to be operated in a jump reproduction mode, the reproduction system is operated in one jump reproduction mode so that only the sequential video data corresponding to I frame to which the intraframe predictive method is applied to compress the video data is outputted from the video decoder 6 in the reproduction system.

The jump reproduction method according to the present invention can be applied also to video data of a moving picture compressed by methods other than the MPEG method. However, in the ensuing description, the method for jump reproducing video data of a moving picture coded with high efficiency by the MPEG method will be described.

Figures 4A, 4B, 4C, 4D, 4E, 4F:
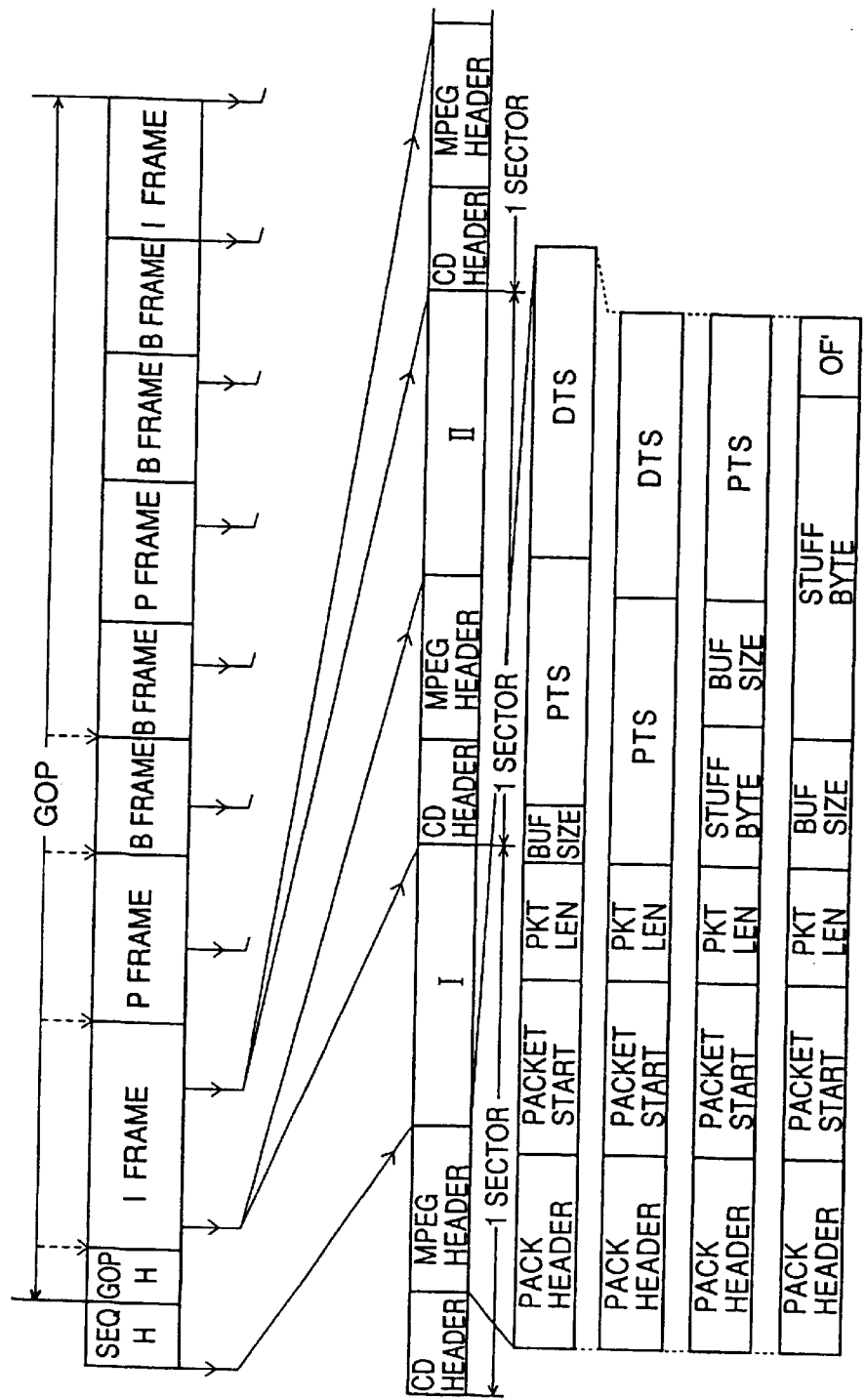
FIGS. 4A, 4B, 4C, 4D, 4E and 4F illustrate the arrangement of data for explaining the method for jump reproducing video data of a moving picture coded with high efficiency according to the present invention.

FIGS. 4A to 4F are views for explaining the arrangement of data relating to video data of a moving picture compressed with high efficiency in the case where video data of a moving picture compressed with high efficiency by the MPEG method is recorded in an optical disk in accordance with a CD (Compact Disk) Standard. FIG. 4B shows the arrangement of recorded data in successive sector portions in which data relating to the video data of a moving picture compressed with high efficiency are recorded in the optical disk in accordance with the CD Standard.

FIG. 4A illustrates contents (data fields I, II) of MPEG video data to be recorded sequentially in connection with one GOP (Group of Pictures) next to a portion of MPEG system header which is a first data to indicate a compression method in each sector shown in FIG. 4B described above. The aforesaid GOP is constructed such that a sequence header (SEQ H) which is a second data to indicate the presence of the GOP is located at the head of the GOP, a GOP header is located continuous to the sequence header, and successive picture frames are arranged continuous to the GOP header.

The sequence header is composed, in addition to a sequence header code, of horizontal and vertical sizes of a picture, data of an aspect ratio, and other various data. The GOP header is composed of data indicative whether or not those arranged preceding to a leading portion of GOP are a group start code, a time code and a closed GOP, a broken link (which when it is 1, has a function not to allow the MPEG video decoder effect a decoding operation with respect to B frame which is present between I frame and P frame constituting a GOP to which GOP header is attached), and other various data.

The aforesaid GOP is composed of a group of video data of I frame, video data of P frame and video data of B frame. The video data of I frame is necessarily located immediately after the GOP header.

The closed GOP (in which all I, P and B frames necessary for reproducing video data expressed by this GOP are included) is a GOP having an arrangement of video data like GOP header → video data of I frame → video data of P frame →. . . A GOP having an arrangement of video data like GOP header → video data of I frame →video data of B frame →. . . is to be expressed as an expression of GOP which is not the closed GOP in the present specification.

The present invention employs the data format such that as indicated by arrows from FIG. 4A toward FIG. 4B, a sequence header, a GOP header and a leading portion of I frame continuous to the GOP header in FIG. 4A are arranged in data field I in FIG. 4B, a central portion of I frame is arranged in data field II, and finally, the end of the least I frame of GOP in FIG. 4A coincides with the end of the data field continuous to the MPEG header in FIG. 4A, that is, the end of 1 sector.

Conventionally, the leading portion of I frame continuous to the GOP header is not necessarily located in the data field I shown in FIG. 4B. On the other hand, in the present invention, since the data format as described above was employed, the jump reproduction capable of easily detecting I frame (as will be described later) can be realized.

FIGS. 4C to 4F show the specific contents of the MPEG system header shown in FIG. 4B. In these FIGURES, PTS and DTS indicate time stamps. One time stamp PTS (presentation time stamp) is (a third) data representative of the time for actually displaying the picture while the other time stamp (decoding time stamp) is time data representative of the time for delivering data to the MPEG video decoder.

There are provided many kinds of specific contents of the MPEG system header as shown in FIGS. 4C to 4F because the contents of video data recorded in the sectors in which the MPEG system header is present and the modes of recording can be indicated according to the presence or absence of the time stamp contained in the MPEG system header and the discrimination of kinds of time stamps. In the case where as the specific content of the MPEG system header, both two kinds of time stamps PTS and DTS are present in the MPEG system header as shown in FIGS. 4C and 4D, it means that coded I frame or P frame started within the sector in which the MPEG system header is located. Particularly, in the MPEG system header having the content as shown in FIG. 4C, this MPEG system header is located in the first sector in each video sequence in which a plurality of GOPs as illustrated in FIG. 4A are continuously provided.

Further, in the case where only the time stamp PTS is present in the MPEG system header as shown in FIG. 4E, it means that coded B frame started within the sector in which the MPEG system header is located. In addition, in the case where neither time stamp PTS nor DTS is present in the MPEG system header as shown in FIG. 4F, it means that a starting boundary (as indicated by the dotted arrows in FIG. 4A) of video frame of any of I frame, P frame and B frame is not included in the sector in which the MPEG system header is located.

It is to be noted that PACK header, PACKET START, PKT LEN, BUF SIZE, STUFF BYTE and OF' shown in FIGS. 4C to 4F are defined in the MPEG Standard.

Conventionally, it is permitted that the state where I frame starts in the midst of the sector occurs. Therefore, in the case where an optical disk having video data of a moving picture coded with high efficiency by the MPEG method recorded therein is reproduced in a jump reproduction mode to obtain successively thinned-out reproduced pictures from the video data of a moving picture coded with high efficiency by the MPEG method, I frame is detected by an MPEG video decoder, the video data of the I frame is then subjected to decoding operation, and after completion of the decoding operation, the succeeding seeking operation is carried out. This requires much time, and it takes long time to obtain successive pictures of I frame. As a result, the number of pictures per unit time at the time of jump reproduction is reduced, and the smoothness of movement of the reproduced pictures was insufficient.

In view of the foregoing, according to the method for jump reproducing video data of a moving picture coded with high efficiency according to the present embodiment, in the case where only the pictures of video frames to which an interframe predictive method is applied to compress video data are sequentially reproduced from video data of a moving picture coded with high efficiency in which a video frame to which an intraframe predictive method to compress video data and a video frame to which an interframe prediction is applied to compress video data are present in a mixed form, a leading portion of a sequence header previously added to video data of a moving picture of I frame is located at the head of a sector. Alternatively, in the case where, after I frame has appeared, at least a sector provided with time stamp PTS which indicates the moment to reproduce the I frame appears after I frame has appeared, video data to the end of at least a sector provided with time stamp PTS are supplied to the MPEG decoder whereby the detection time of successive I frames is shortened to increase the number of pictures per unit time at the time of jump reproduction so as to easily obtain smooth-movement reproduced pictures.

Figures 5, 6:
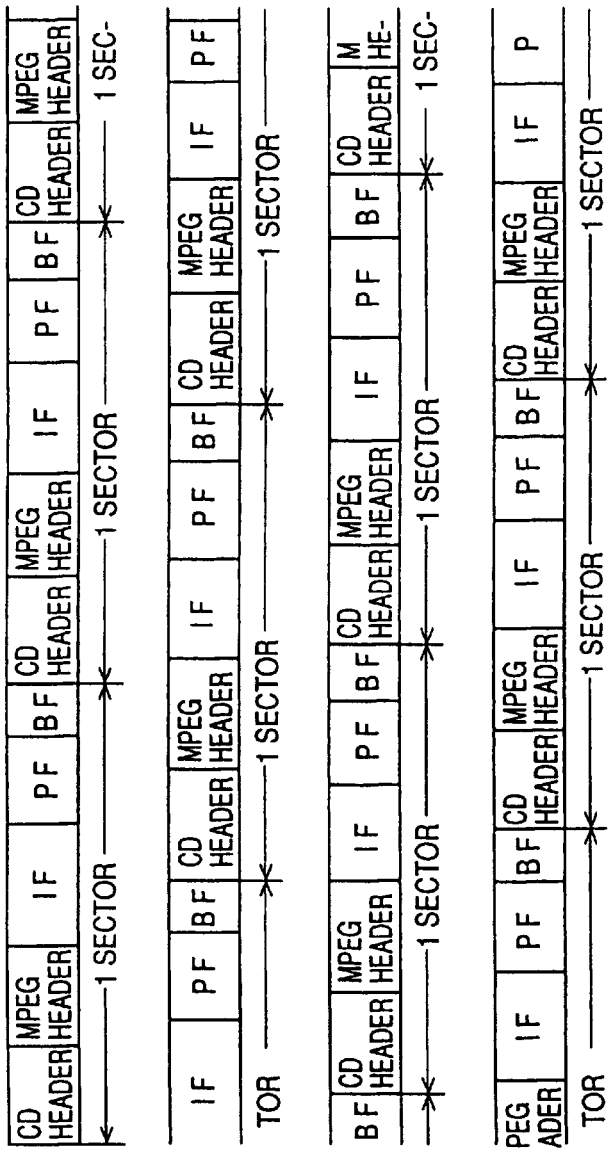
FIG. 5 illustrates the arrangement of data for explaining the method for jump reproducing video data of a moving picture coded with high efficiency according to the present invention.
FIG. 6 illustrates an example of actual measurement of the spacing between I frames present in the bit stream and the times of appearance of such spacing.

FIG. 5 is a view of the arrangement of data showing the stats where in order that I frame may be easily detected from a bit stream in which I frame to which an intraframe predictive method is applied to compress video data, and P frame and B frame to which an interframe prediction is applied to compress video data are present in a mixed form. As shown, I frame to be used when the reproduction system is in a jump reproduction mode out of video data of a moving picture previously coded with high efficiency by the MPEG method comprises only one in connection with successive GOPs.

As will be apparent from the description with respect to the MPEG method previously made with reference to FIG. 4, a leading portion of a sequence header added immediately before each GOP is always located at a leading portion of a sector (a portion continuous to a CD header and an MPEG system header arranged at the foremost portion of the sector). The MPEG system header located at the first sector in each video sequence to which a plurality of GOPs are continuous as illustrated in FIG. 4A has the content as shown in FIG. 4C. The video frame succeeding to the GOP header is necessarily I frame. Therefore, if I frame to be used when the reproduction system is in a jump reproduction mode as described above comprises only one in connection with the successive GOPs, a leading portion of a sequence header previously added to video data of a moving picture of I frame is to be located at the head of a sector. In the detection of I frame to be used when the reproduction system is in a jump reproduction mode as described above, it will suffice to see whether or not the MPEG system header in the successive sectors is present. The detection of I frame can be easily carried out in a short period of time.

When the reproduction system is in a jump reproduction mode, successive I frames are present. The decoding operation of video data in the MPEG video decoder is merely applied to video data of I frame. Therefore, assume now that a GOP containing video data to be reproduced comprises a closed GOP, since the data arrangement is such as I frame → P frame → B frame, time stamps present in the MPEG system header are PTS and DTS in a sector in which I frame appears, and are PTS and DTS also in a sector containing an end portion of I frame and a start portion of P frame.

Accordingly, when the state where the time stamps PTS and DTS appear as described above appears in the second time, video data to the end of the sector where the time stamps PTS and DTS appear in the second time are supplied to the MPEG decoder. Then, the video data of the detected I frame can be supplied at least to the MPEG decoder.

Further in the case where a GOP containing video data to be reproduced is a GOP which is not a closed GOP, the data arrangement is normally such as I frame → B frame . . . Therefore, time stamps present in the MPEG system header are PTS and DTS in a sector in which I frame appears, and the time stamp in a sector containing an end portion of I frame and a start portion of B frame is only PTS.

Accordingly, in the case where the time stamp PTS appears next to the state where the time stamps PTS and DTS appear as described above, if the video data to the end of the sector in which the time stamp PTS appears is supplied to the MPEG decoder, the video data of I frame detected can be supplied at least to the MPEG decoder.

That is, in the jump reproduction of video data of a moving picture coded with high efficiency by the MPEG system in which I frame, P frame and B frame are present in a mixed form, at least a sector provided with a time stamp PTS appears after the appearance of I frame. In this case, video data to the end of at least the sector provided with the time stamp PTS is supplied to the MPEG decoder to enable the supply of all the video data of I frame to the MPEG decoder.

As will be apparent from the above detailed description, according to the method for jump reproducing video data of a moving picture coded with high efficiency of the present embodiment, a leading portion of a sequence header added to video data of a moving picture coded with high efficiency in which a video frame to which an intraframe prediction method is applied to compress video data and a video frame to which an interframe prediction is applied to compress video data are present in a mixed form is located in advance at the head of a sector, whereby the detection of I frame can be carried out in a short period of time. Further, in the case where at least a sector provided with a time stamp PTS appears after the appearance of I frame, video data to the end of at least a sector provided with the time stamp PTS are supplied to a decoder so that the seeking operation of an optical disk can be carried out within the time when the decoder carries out the decoding operation. Therefore, the time required for the successive detections of I frame can be shortened to facilitate increasing the number of pictures capable of being reproduced per unit time and to render smooth the movement of a moving picture reproduced in the jump reproduction mode.

In the following, a reproduction method for reproducing pictures by quick traverse and quick reverse, which is the method for jump reproducing video data of a moving picture coded with high efficiency by the MPEG method or the like according to the present invention, will be described.

Also in the quick traverse and quick reverse video reproduction method according to the present invention, the reproduction system shown in FIG. 3 is used. Further, the quick traverse and quick reverse reproduction method according to the present invention can be applied also to video data of a moving picture compressed by methods other than the MPEG method. However, in the following description, the method for reproducing by quick traverse and quick reverse for video data of a moving picture coded with high efficiency by the MPEG method will be explained.

The method for reproducing by quick traverse and quick reverse according to the present invention effectively utilizes, in a bit stream in which I frame, P frame and B frame comprising video data of a moving picture coded with high efficiency by the MPEG method are present in a mixed form, the fact that the coding has been heretofore carried out in consideration so that I frames are arranged at approximately equal intervals on the average on the bit stream, that is the fact that the I frames are arranged in advance in the bit stream so that the average spacing between the I frames is a predetermined spacing so as to have a constant spacing between displayed pictures. In the reproduction of quick traverse, the search of I frame to be reproduced next to the reproduced I frame starts at a position set by subtracting a constant value K from an integerfold of the predetermined spacing. On the other hand, in the reproduction of quick reverse, the search of I frame to be reproduced next to the reproduced I frame starts at a position set by adding a constant value M to an integerfold of the predetermined spacing. With this, the following times (1) to (3), which are required every reproduction of video data of successive I frames in the case where the quick-traversed or quick-reversed pictures are reproduced from the bit stream in which I frame, P frame and B frame comprising video data of a moving picture coded with high efficiency by the MPEG method are present in a mixed form as described above, can be shortened: (1) the time till skipping to a position of a bit stream to start next reproduction, (2) the time till the detection of I frame after the start of reproduction of the bit stream from the skipped position, and (3) the time for reproducing all the I frames detected. Particularly, the time described in (2) can be considerably shortened.

FIG. 6 illustrates the times of appearance of a spacing value (a unit of spacing is 1 sector length=2296 bytes) between I frames in a bit stream, as one actual example in which the I frames are arranged in advance in the bit stream so that an average spacing between the I frames is a predetermined spacing so as to have a constant spacing between displayed pictures. In the case of the above-described actual example, there is a slight unevenness between a spacing value corresponding to a 36 sector length and a spacing value corresponding to a 43 sector length. An average spacing corresponds to a 39.86 sector length.

Since a storage volume of a buffer memory in an MPEG decoder is 40 kilobytes as prescribed in the MPEG Standard, a variable amount of the data amount caused by the unevenness of the spacing between I sectors in the bit stream may be within ±20 kilobytes. The variable amount of the data amount caused by the spacing between I sectors in the bit stream shown in FIG. 6 is within ±9 kilobytes.

For example, in the case where the spacing between I frames in the bit stream is such that the minimum value of the spacing is a value corresponding to a 36 sector length and the maximum value of the spacing is a value corresponding to a 43 sector length, if a position distanced by the 36 sector length from a position of a head of I frame being reproduced at present is accessed in order to select a next I frame, the next I frame as intended appears within a 7 sector length from the 36 sector length to the 43 sector length even in the case of the worst.

In the production method for reproducing by quick traverse and quick reverse from video data of a moving picture coded with high efficiency according to the present invention, in the case where an average spacing between I frames in which the I frames are arranged in advance in the bit stream so that the average spacing between I frames is a predetermined spacing so as to have a constant spacing between displayed pictures corresponds to a 39.86 sector length, for example, as shown in FIG. 6, and in order to select a next I frame when a certain I frame is reproduced at the time of the quick traverse reproduction, if a position distanced by (N−1)×39.86+36 sector length (wherein N is a number indicative of a numerical value which becomes larger as the magnification of the quick traverse increases, N=0, 1, 2, 3 . . . ) is accessed, a next I frame as intended appears within a 7 sector length even in the case of the worst. Further, in the case where an average spacing between I frames in which the I frames are arranged in advance in the bit stream so that the average spacing between I frames is a predetermined spacing so as to have a constant spacing between displayed pictures corresponds to a 39.86 sector length, for example, as shown in FIG. 6, and in order to select a next I frame when a certain I frame is reproduced at the time of the quick reverse reproduction, if a position distanced by (N−1)×39.86+43 sector length (wherein N is a number indicative of a numerical value which becomes larger as the magnification of the quick reverse increases, N=0, 1, 2, 3 . . . ) is accessed, a next I frame as intended appears within a 7 sector length even in the case of the worst. Here, the magnification is obtained by dividing an average time normally required to reproduce between the present I frame and the next I frame by an average time required to reproduce the next I frame.

That is, in the quick traverse reproduction in the case where the average spacing between I frames arranged in advance in the bit stream corresponds to the 39.86 sector length as shown in FIG. 6, it is $$f\{39.86 \times N - 3.86\} \text{ sector length} \ldots \text{(FF)}$$

(wherein f $\{n\}$ is the maximum natural number smaller than n) from the position of the head of the I frame being reproduced at present.

On the other hand, in the quick reverse reproduction, it is:

$$g\{39.86 \times N + 3.14\} \text{ sector length} \ldots \text{(FB)}$$

(wherein g $\{n\}$ is the minimum natural number larger than n) from the position of the head of the I frame being reproduced at present.

N in the above-described formulae (FF) and (FB) is a number indicative of a numerical value which becomes larger as the magnification of the quick traverse and quick reverse increases N=1, 2, 3 . . . Accordingly, if a position distanced by the spacing indicated in the abovedescribed formulae (FF) and (FB) is accessed, I frame as intended can be immediately searched.

When the above-described formulae (FF) and (FB) are written in the form of a general formula, the general formula at the time of the quick traverse reproduction and that at the time of the quick reverse reproduction can be expressed by the formulae (FF1) and (FB1) below, respectively:

$$f\{N \times (\text{an average spacing value between I frames determined corresponding to a predetermined spacing so as to have a constant spacing between displayed pictures}) - K\} \quad \text{(FF1)}$$

wherein f $\{n\}$ is the maximum natural number smaller than n.

$$g\{N \times (\text{an average spacing value between I frames determined corresponding to a predetermined spacing so as to have a constant spacing between displayed pictures}) + M\} \quad \text{(FB1)}$$

wherein g $\{n\}$ is the maximum natural number larger than n.

In the above-described formulae (FF1) and (FB1), N is a number indicative of a numerical value which becomes larger as the magnification of the quick traverse and quick reverse increases, N=1, 2, 3 . . . K is K=(an average spacing value between I frames determined corresponding to a predetermined spacing so as to have a constant spacing between displayed pictures)−(the minimum value out of the spacing value between I frames). M is M=(the maximum value out of the spacing value between I frames)−(an average spacing value between I frames determined corresponding to a predetermined spacing so as to have a constant spacing between displayed pictures).

In the reproduction system shown in FIG. 3, when a foldspeed number N is inputted by a device such as a remote control device not shown, CPU 4 calculates the number of sectors to be accessed next in accordance with the formulae (FF) and (FB) to issue a command so as to access to a predetermined position of a recording medium or the like to the coded signal source 1 through the interface 2.

As will be apparent from the detailed description as described above, the reproduction method for reproducing by quick traverse and quick reverse from video data of a moving picture coded with high efficiency according to the present invention utilizes the fact that in the case where only the picture of I frame is selected and reproduced from video data of a moving picture coded with high efficiency in which I frame, P frame and B frame are present in a mixed form to reproduce pictures by quick traverse and quick reverse, an average spacing between I frames arranged in a bit stream is a predetermined spacing so as to have a constant spacing between displayed pictures. Thereby, in the reproduction of a picture by quick traverse, the search for i frame to be reproduced next to the reproduced I frame starts at a position set by subtracting a constant value K from an integerfold of the predetermined spacing. On the other hand, in the reproduction by the quick reverse, the search for I frame to be reproduced next to the reproduced I frame starts at a position set by adding a constant value M to an integerfold of the predetermined spacing. Thereby, the time till the detection of I frame after the start of reproduction of a bit stream from the skipped position can be shortened, and the number of reproduced pictures per unit time can be increased. It is possible to easily obtain a reproduced picture which is excellent in smoothness of movement.

In the following, the special reproduction such as a reversed foldspeed reproduction, and a slow motion reproduction, which is the jump reproduction method for video data of a moving picture coded with high efficiency by an MPEG method or the like, will be described. This special reproduction can be applied also to video data of a moving picture compressed by systems other than the MPEG method. However, in the ensuing explanation, the special reproduction for video data of a moving picture coded with high efficiency by the MPEG method will be described.

In the special reproduction according to the present invention, independent frame access data indicative of an address of a leading sector in a field in which I frame before or after the present I frame is recorded, as relative position data or absolute position data from the present sector, in an independent subcode field in order to positively access to a leading sector of GOP to be accessed.

The independent frame access data recorded in the independent subcode field is not interleaved between data of other recording field and can be read easily and at high speeds without necessity of complicated processing such as correction of error, deinterleave and the like.

When the special reproduction takes place, access is effected with reference to the independent frame access data, and the efficient special reproduction for a video of a compressed moving picture is realized.

FIGS. 7A to 7E show the recording modes of a recording medium according to the present invention.

Figure 7A:
FIGS. 7A, 7B, 7C, 7D and 7E illustrate the arrangement of data recorded in a video recording medium according to the present invention.

FIG. 7A shows Mth to (M+5)th GOPs of video data recorded in the recording medium. In the case of a fixed transfer rate, the amount of codes of each GOP is substantially constant, but in the case of a variable transfer rate, it sometimes greatly differs.

It is to be noted that the Mth GOP is an (early) GOP earlier in time than the (M+1)th GOP. In the description made herein, however, one which is early (past side) in time is referred to as before, and one which is late (future side) in time is referred to as after.

Figure 7B:
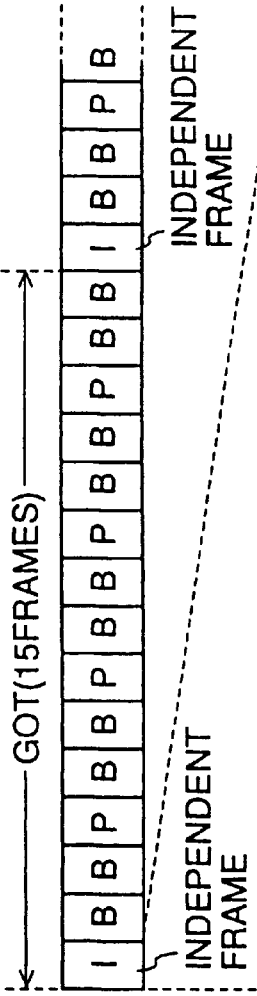
Figure 7C:
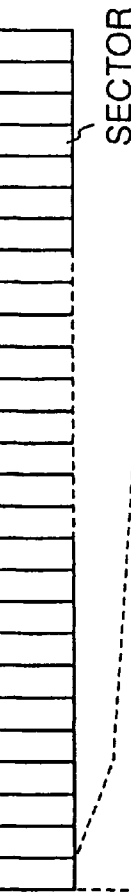

FIG. 7B shows the Mth GOP shown in FIG. 7A, in which 15 frames beginning I frame are recorded. Other GOPs are also the same. FIG. 7C shows a state where the I frame shown in FIG. 7B is recorded in a plurality of sectors.

Figure 7D:
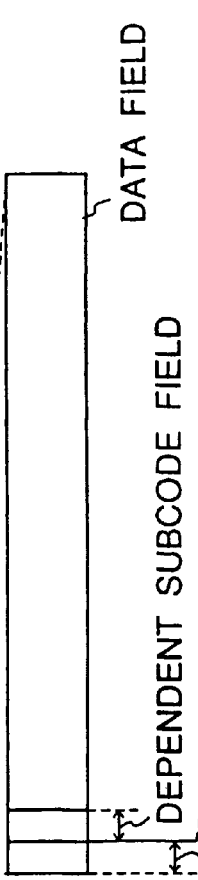
Figure 7E:
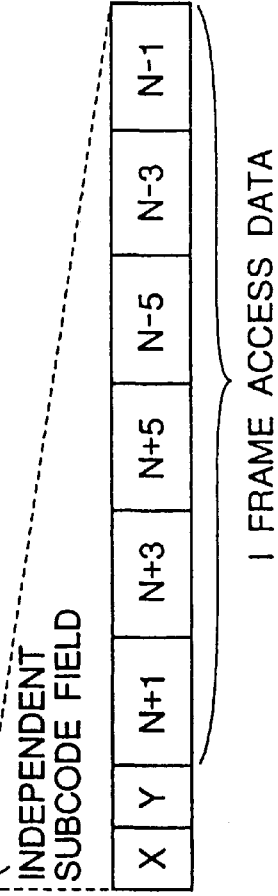

FIG. 7D shows the first sector of the I frame shown in FIG. 7C the second and thereafter sectors are also the same. Each of these sectors comprises a subcode field in which management data and control data are recorded and a data field in which video data and the like are recorded. The subcode field consists of an independent subcode field (a first recording field) and a dependent subcode field (a second recording field).

The data recorded in the independent subcode field is not applied with an interleave between data recorded in other fields. On the other hand, data recorded in the dependent subcode field is applied with an interleave between data recorded in a data field (a third recording field).

The data recorded in the independent subcode field are control data X, absolute sector No. Y indicative of an absolute address of the sector, and I frame access data indicative of the first sector in which each I frame of other GOPs in the vicinity of the present GOP No. N is recorded, and so on.

Recorded in all the sectors in which Nth GOP is recorded as the I frame access data is the first sector No. in which for example, each I frame of the N+1th, N+3th, N+5th, N−5th, N−3th and N−1th GOP is recorded. A wide range of special reproduction as described later can be carried out using less data as described.

In the case where the aforesaid sector No. is expressed as an absolute address, one and the same data is recorded in all the sectors within 1 GOP. On the other hand, in the case where the aforesaid sector No. is expressed by a relative address from the present sector, data which are different every sectors are recorded even the sectors within 1 GOP. However, the absolute address calculated therefrom is the same. In the case of the relative address, the data amount is so small that they can be read quickly to provide a good efficiency.

One example of data recorded in the independent subcode field will be described with reference to FIG. 8.

Figure 8A:
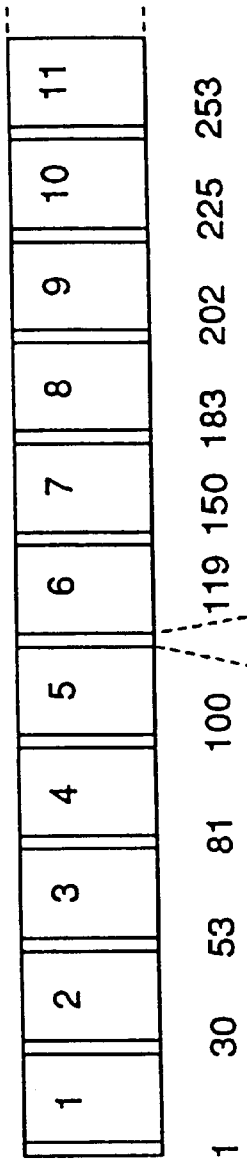
FIGS. 8A and 8B illustrate the arrangement of data recorded in a video recording medium according to the present invention.
Figure 8B:
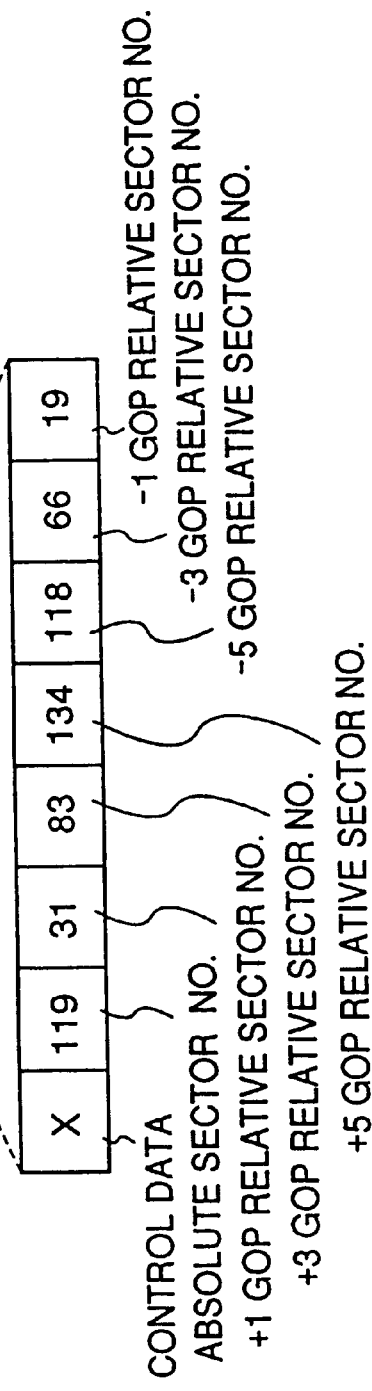

FIGS. 8A and 8B show one example of the recording mode in a video data recording medium according to the present invention.

FIG. 8A shows No. of a leading sector of I frame of each GOP recorded in the recording medium, showing the 1st to 11th GOP, that is, GOP 1 to GOP 12.

Nos. of leading sectors of I frame of respective 1st to 11th GOPs are 1, 30, 53, 81, 100, 119, 150, 183, 202, 225 and 253, respectively.

FIG. 8B shows data recorded in an independent subcode field in a leading sector 119 in a field in which I frame of the 6th GOP, i.e. GOP 6 is recorded. Control data X and 119 which is an absolute No. of the present sector are recorded. Nos. of leading sectors of I frames of GOP 7, GOP 9, GOP 11, GOP 5, GOP 3 and GOP 1 are shown in the offset amount from the sector 119.

The data shown in FIG. 8B are similarly recorded in all the sectors in which GOP 6 is recorded. However, when the sector No. is expressed as a relative value, a value deviated by one address per 1 sector is recorded.

One and the same access address is recorded in all the sectors belonging to 1 GOP as described previously in order that the special reproduction can be easily carried out in the reproduction of the video recording medium according to the present invention.

Next, the reproduction method for a video recording medium according to the present invention will be described with reference to FIG. 9.

Figure 9:
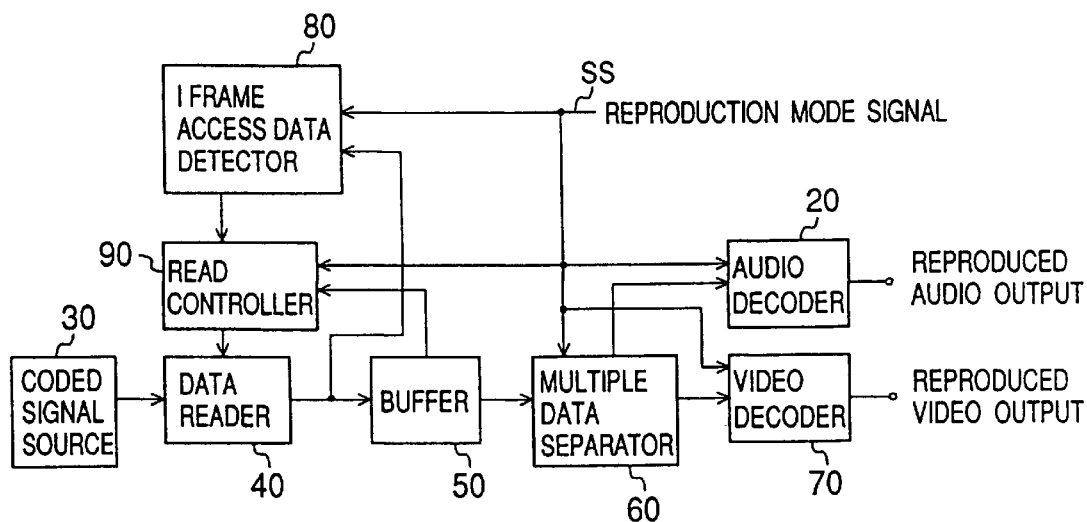
FIG. 9 is a block diagram showing a schematic configuration of one embodiment of a reproduction system used in the method for jump reproducing video data of a moving picture coded with high efficiency according to the present invention.

FIG. 9 shows one example of a reproduction system for a video recording medium according to the present invention.

Further, FIG. 9 is a block diagram showing one example of the reproduction system for a video recording medium according to the present invention.

First, a description will be made of carrying out normal reproduction for a video recording medium according to the present invention using the reproduction system shown in FIG. 9.

The normal reproduction herein termed indicates a mode reproduced forward at real time. A read controller 90 is instructed by a reproduction mode signal SS so as to effect reproduction at 1 foldspeed.

In FIG. 9, the reproduction in the case where video data resulting from coding of a fixed transfer rate is recorded in the video recording medium is of the general type. Therefore, in this specification, a description is made of data recorded at a variable transfer rate.

Codes from a coded signal source 30 such as video recording media are intermittently read by a data reader 40, and then inputted into a buffer 50. It is to be noted that the coded signal source 30 can be of a configuration capable of delivering compressed data supplied through a communication line.

In the buffer 50, data intermittently outputted from the data reader 40 are read, and the data are outputted towards a multiple data separator 60 at the timing necessary for decoding data.

In the multiple data separator 60, audio data is separated from video data. The audio data and the video data are inputted into an audio decoder 20 for decoding sounds and a video decoder 70 for decoding pictures, respectively. In the audio decoder 20 and the video decoder 70, the audio data and the video data are respectively decoded and accumulated in a buffer of the decoder, and the reproduced audio and the reproduced video are respectively outputted.

On the other hand, data outputted from the buffer 50 are supplied to the read controller 90. At this time, the buffer 50 becomes close to empty when a data amount to be written is less than a data amount to be used for decoding, whereas the buffer becomes close to full when the data amount to be written is more than the data amount to be used for decoding.

A read control command is outputted from the read controller 90 to the data reader 40 according to the status of the buffer 50. That is, when a buffer of the buffer 50 is close to empty, a read control command is outputted so as to start reading or to continue reading. When the buffer 50 is close to full, a read control command is outputted so as to standby reading.

The reading of data from the recording medium by the data reader 40 is carried out in unit, for example, such as one rotation of a disk.

Even if the reading of data from the medium by the data reader 40 is not carried out at the present time whereas data is read from the buffer 50 at the maximum rate for the purpose of decoding, the reading by the data reader 40 is controlled so that a buffer of the buffer 50 will not be empty till next reading starts.

Next, a description will be made of the case where a command for execution of the special reproduction by the reproduction mode signal SS was issued to the read controller 90, the I frame access data detector 80, and the multiple data separator 60, in the case of video data coded at the fixed transfer rate.

The special reproduction indicates reproductions other than the normal reproduction as previously described, indicates, for example, such as 2 foldspeed, −2 foldspeed (2 foldspeed in the reverse direction), −1 foldspeed, 5 foldspeed, −5 foldspeed, etc.

In this specification, an example in which the special reproduction of 5 foldspeed is instructed by the reproduction mode signal SS will be described with reference to FIGS. 8 and 9.

In FIG. 9, output of the data reader 40 is applied to the buffer 50 as well as the I frame access data detector 80. In the I frame access data detector 80, the I frame access data is detected and then applied to the read controller 90.

In the data reader 40, I frames of the GOPs are read under the control of the read controller 90. In the video decoder 70, only the I frame is decoded, and one and the same reproduced picture is outputted for a predetermined period of time. For example, if a picture is of 30 frame/sec, one I frame is displayed on a display unit (not shown) for a period of time corresponding to 15 frames (for approximately 0.5 sec). The control of the display time is carried out by controlling read-out of the buffer of the video decoder 70 on the basis of the reproduction mode signal SS. It is not necessary to read video data other than the I frame but when read, it is disposed without using.

In the read controller 90, a sector to be accessed next is calculated, according to the I frame access data of each GOP and the reproduction mode signal SS, and then sent to the data reader 40.

This will be described by way of an example shown in FIG. 8. In case of forward 5 foldspeed, I frames are read and decoded, for example, in order of GOP 1, GOP 6, GOP 11, GOP 16.

For example, the I frame access data recorded in sector 119 is detected by the I frame access data detector 80 before video data of GOP 6 is read, and the first sector 253 in which I frame of GOP 11 to be reproduced next to GOP 6 is recorded is calculated by the read controller 90 and sent to the data reader 40.

In the data reader 40, when reading of I frame of GOP 6 is completed, the sector 253 is accessed and I frame of GOP 11 is read.

Generally, in the case where data is read from a recording medium by a pickup such as an optical head, the pickup cannot be moved at high speeds. Even if a part of the pickup, for example, only an objective lens can be moved at high speeds, the function of the special reproduction is still limited since there is a limit in the moving range.

The access operation in the reproduction system shown in FIG. 9 will now be described.

Assume now that the number of frames included in one GOP is 15 (1 for I frame, 4 for P frame and 10 for B frame) as in the example shown in FIG. 7B, and the ratio of the data amount among the three kinds of compressed frames (I, P and B) is, for example, I:B:P=7:1:3, the data read time of I frame:the read time of 1 GOP (the read time of I frame+the read time of B frame+the read time of P frame) is 1×7:(1× 7+10×1+4×3) =7/29. Accordingly, the data read time for I frame is 7/29 of the data read time for 1 GOP, and other time of about 22/29 can be used for the access to next I frame.

More specifically, in case of the picture of 30 frames/sec, the GOP length is approximately 500 ms for 15 frames, and the data read time for I frame is approximately 120 mS (=500 mS×7/29).

In the reproduction system shown in FIG. 9, the time required for one access is 380 mS (=500 mS−120 mS). In the example shown in FIG. 8, the access of data recorded distanced each other, for example, for 5 GOPs, can be made. Therefore, in this case, (500 mS×5)/(120 mS+380 mS)=5 (foldspeed) results.

Thereby, reading is effected in order of GOP 1, GOP 6, GOP 11 and GOP 16.

As one example, the special reproduction of 4 foldspeed will now be described.

In the 4 foldspeed reproduction, reading is effected in order of GOP 1, GOP 5, GOP 9, GOP 13 . . . But, GOP 5 is not directly accessed next to GOP 1 but GOP 4 is first accessed and GOP 5 is then accessed. That is, substantially one access is carried out by two accesses.

In the case where GOP 4 is accessed after reading I frame in GOP 1, a sector 81 is not necessarily accessed, and any sector in which GOP 4 is recorded can be accessed.

The reason why is that I frame access data indicative of one and the same access is recorded in any sector in which GOP 4 is recorded. As a result, the access time can be shortened. It is to be noted that one I frame read is displayed for about 0.5 sec.

In the reproduction system 20 in the embodiment, the special reproduction of a maximum 15 foldspeed is carried out. In this case, substantially one access is carried out by three accesses.

Figure 10:
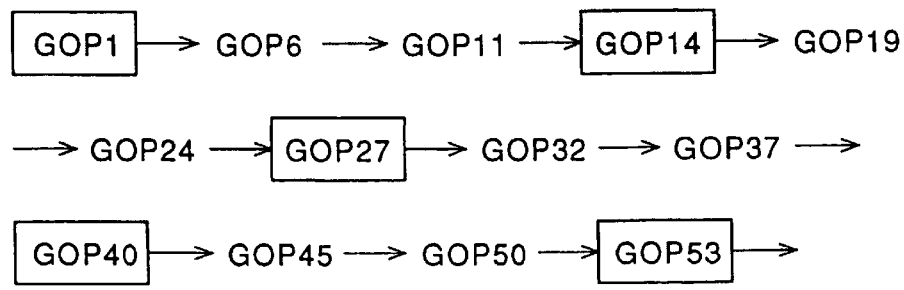
FIG. 10 illustrates the access order in case of 13 fold-speed.

FIG. 10 shows an access order of 13 foldspeed reproduction.

As shown in FIG. 10, in the 13 foldspeed reproduction, I frames are reproduced, for example, in order of GOP 1, GOP 14, GOP 27, GOP 40, GOP 53 However, GOP 14 is not directly accessed after I frame of GOP 1 has been read but access is performed in order of OP 6, GOP 11 and GOP 14.

The access from GOP 1 to GOP 6 is carried out on the basis of I frame access data recorded in a field in which GOP 1 is recorded. GOP 14 is accessed on the basis of I frame access data recorded in a field in which GOP 6 is recorded. The access to GOP 6 and GOP 11 need not be accurate. That is, I frame access data indicative of one and the same access is recorded in any sector of a field in which these GOPs are recorded, and sector No. to be accessed next is calculated from the sector No. read and the I frame access data.

In the reverse 13 foldspeed reproduction, each I frame is read, for example, in order of GOP 53, GOP 40, GOP 27, GOP 14 . . . and recorded. The reproduced picture is displayed on the display unit every about 0.5 sec.

While in the description so far made, an address of a leading sector in a field in which each I frame is recorded has been recorded as I frame access data, it is to be noted of course that an address of a sector before or after several sectors from the leading sector can be recorded, and thereafter, an address of the leading sector can be calculated.

According to the video recording medium and the reproduction method of the present invention, in the special reproduction of a video coded with high efficiency, an access portion can be detected easily and at high speeds, and therefore, a wide range of special reproduction can be made. Further, it is also possible to perform a special reproduction of a picture coded at a variable transfer rate.

What is claimed is:

1. A recorded medium on which moving picture data is recorded, said moving picture data coded with high efficiency in accordance with a moving picture experts group (MPEG) method in which an I picture frame to which an intraframe coding is applied is at least present, said moving picture data including a plurality of sequence headers and a plurality of groups of pictures (GOPs), each of said plurality of sequence headers being followed by one or more GOPs, said GOPs including at least one said I picture frame and starting with at least said I picture frame, a recording area of the recorded medium being divided into a plurality of sectors, each sector of said plurality of sectors having a sector header and a data field which follows said sector header, each sector header having an MPEG system header which is located at the end of each sector header;

the recorded medium comprising:

said moving picture data being recorded in said recorded medium in such a way that a recorded position of each sequence header of said plurality of sequence headers of said moving picture data comes just after said MPEG system header and matches a head position of said data field of a sector which is one of said plurality of sectors in said recorded medium.

2. A method of recording moving picture data on a recording medium, said moving picture data coded with high efficiency in accordance with a moving picture experts group (MPEG) method in which an I picture frame to which an intraframe coding is applied is at least present, said moving picture data including a plurality of sequence headers and a plurality of groups of pictures (GOPs), each of said plurality of sequence headers being followed by one or more GOPs, said GOPs including at least one said I picture frame and starting with at least said I picture frame, said recording medium having a recording area being divided into a plurality of sectors, each sector of said plurality of sectors having a sector header and a data field which follows said sector header, each sector header having an MPEG system header which is located at the end of each sector header;

the method comprising:

recording said moving picture data in such a way that a recorded position of each sequence header of said plurality of sequence headers of said moving picture data comes just after said MPEG system header and matches a head position of said data field of a sector which is one of said plurality of sectors in said recording medium.

3. A reproduction apparatus comprising:

seeking means for seeking a head recorded position of a sequence header of moving picture data from a recorded medium on which said moving picture data is recorded, said moving picture data coded with high efficiency in accordance with a moving picture experts group (MPEG) method in which an I picture frame to which an intraframe coding is applied is at least present, said moving picture data including a plurality of sequence headers and a plurality of groups of pictures (GOPs), each of said plurality of sequence headers being followed by one or more GOPs, said GOPs including at least one said I picture frame and starting with at least said I picture frame, said recorded medium having a recording area thereof being divided into a plurality of sectors, each sector of said plurality of sectors having a sector header and a data field which follows said sector header, each sector header having an MPEG system header which is located at the end of each sector header, and said moving picture data being recorded in said recorded medium in such a way that a recorded position of each sequence header of said plurality of sequence headers of said moving picture data comes just after said MPEG system header and matches a head position of said data field of a sector which is one of said plurality of sectors in said recorded medium;

reproducing means for reproducing, beginning from said head recorded position sought by said seeking means, said sequence header and said I picture frame that follows said sequence header; and control means for controlling a reproduction of said moving picture data by repeating a seeking operation using said seeking means and a reproduction operation using said reproducing means alternately in sequence.

4. A reproduction method comprising the steps of:

predicting and seeking a head recorded position of a sequence header of moving picture data from a recorded medium on which said moving picture data is recorded, said moving picture data coded with high efficiency in accordance with a moving picture experts group (MPEG) method in which an I picture frame to which an intraframe coding is applied and a P or B picture frame to which an interframe coding is applied are at least present in a mixed form, said moving picture data including a plurality of sequence headers and a plurality of groups of pictures (GOPs), each of said plurality of sequence headers being followed by one or more GOPs, said GOPs including at least one said I picture frame and starting with at least said I picture frame, said recorded medium having a recording area thereof being divided into a plurality of sectors, each sector of said plurality of sectors having a sector header and a data field which follows said sector header, each sector header having an MPEG system header which is located at the end of each sector header, and said moving picture data being recorded in said recorded medium in such a way that a recorded position of each sequence header of said plurality of sequence headers of said moving picture data comes just after said MPEG system header and matches a head position of said data field of a sector which is one of said plurality of sectors in said recorded medium;

reproducing, beginning from said head recorded position sought by said seeking means, said sequence header and said I picture frame that follows said sequence header; and controlling a reproduction of said moving picture data by repeating a seeking operation and a reproduction operation alternately in sequence.

* * * * *